(12) United States Patent
Peng et al.

(10) Patent No.: US 7,476,364 B2
(45) Date of Patent: Jan. 13, 2009

(54) THERMAL REGENERATIVE GRANULAR-MOVING BED APPARATUS

(75) Inventors: Ching-Yu Peng, Hsinchu (TW);
Tzu-Yueh Yang, Hsi-Hu Chen (TW);
Hom-Ti Lee, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 623 days.

(21) Appl. No.: 10/900,424

(22) Filed: Jul. 28, 2004

(65) Prior Publication Data

US 2005/0217225 A1    Oct. 6, 2005

(30) Foreign Application Priority Data

Mar. 30, 2004    (TW) .............................. 93108665 A (51) Int. Cl.
*B01D 50/00*    (2006.01)
(52) U.S. Cl. ........................................ 422/168; 55/474
(58) Field of Classification Search ................. 422/168, 422/144; 34/171, 174; 55/79, 99, 474, 479; 165/104.16
See application file for complete search history.

(56) References Cited

U.S. PATENT DOCUMENTS 4,307,773 A * 12/1981 Smith .................... 165/104.16
4,349,367 A * 9/1982 Krumwiede .................... 65/27
4,622,210 A * 11/1986 Hirschberg et al. ......... 422/144

FOREIGN PATENT DOCUMENTS

CN    2042374 U    8/1989
SU    946614 B    7/1982

* cited by examiner

*Primary Examiner*—Tom Duong
(74) *Attorney, Agent, or Firm*—Troxell Law Office, PLLC (57) ABSTRACT

A thermal regenerative granular-moving bed apparatus for a gas de-pollutant process includes a plurality of recycling granular material, a heat-and-clean unit, a heat-recycling unit, and a granular material-cleaning unit. The heat-and-clean unit heats the granular material to further heat a polluted gas, de-pollutes the gas, and detains pollutants or particles from the de-polluting. The heat-recycling unit constructed on top of the heat-and-clean unit has the hot up-flowing de-polluted gas heat-exchange with the down-flowing cold granular material. The granular material-cleaning unit transports the granular material from a lower-end of the heat-and-clean unit to an upper end of the heat-recycling unit and re-activates the granular material during the transportation. By providing the thermal regenerative granular-moving bed apparatus, heating, de-polluting and filtering upon the gas can be carried out in a single unit, and also energy in the de-polluted gas can be transferred and thus saved to pre-heat the cold granular material.

16 Claims, 10 Drawing Sheets

THERMAL REGENERATIVE GRANULAR-MOVING BED APPARATUS

BACKGROUND OF THE INVENTION (1) Field of the Invention

The invention relates to a hi-temperature exhausted-gas purifying apparatus, and more particularly to an apparatus that utilizes a thermal regenerative granular-moving bed apparatus to perform in-situ and continuously gas-cracking, gas-filtering, exhaust gas-recycling, and granular material-heating.

(2) Description of the Prior Art

In some industrial processes, to generate toxic exhaust gases might be inevitable. Generally, those toxic exhaust gases should be cracked under a substantial high temperature and thus detoxicated to meet various environmental regulations before they can be exhausted to the atmosphere. Also, during the detoxicating process, particles or pollutants as the side products are usually generated and should be removed as well before exhausting the gas to the atmosphere.

Toxic gases usually seen in the manufacturing process includes $B_2H_6$, C5F8, $CHF_3$, $CH_2F_2$, CO, $C_4F_6$, $C_2F_6$, $H_2$, $NF_3$, $SF_6$, $SiH_4$, TEOS, $WF_6$, $BCl_3$, $Cl_2$, HCl, $NH_3$, $N_2O$, and so on. In particular, to detoxicate the $BCl_3$, $Cl_2$, HCl, $NH_3$, and $N_2O$, water-bathing or adding adsorbents/catalyst during the process is required.

In the art, conventional facilities to detoxicate the aforesaid toxic gases include a thermal type scrubber, a wet type scrubber, and so on.

Figure 1:
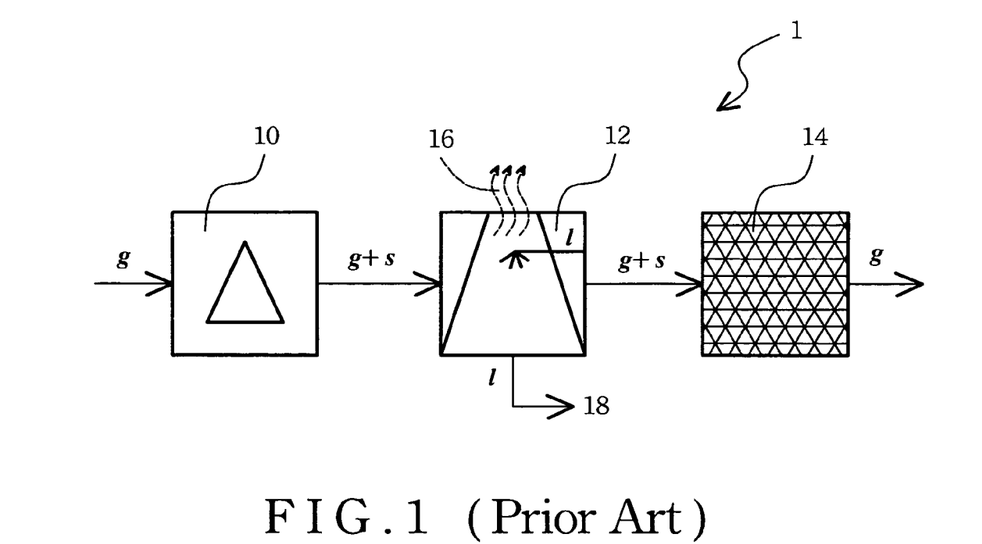
FIG. 1 is a schematic block view of a conventional gas detoxicating and de-polluting system.

Referring to FIG. 1, a conventional gas detoxicating and de-polluting system 1, one of the wet type scrubbers, is schematically shown. The system 1 includes a furnace 10, a liquid-cooling device 12, and a filter 14. In a typical process of the system 1, the toxic gas is firstly sent to the furnace 10 for cracking under a substantial high temperature. In the furnace 10, the toxic gas is cracked into a nontoxic gas with plenty of suspending pollutant particles. The nontoxic gas with the suspending pollutants is then led to the liquid-cooling device 12 for directly or indirectly water-cooling to a lower temperature. The lower-temperature nontoxic gas with pollutants is finally sent through the filter 14 to leave the pollutants at the filter 14 before the nontoxic can be exhausted to a specific area.

Nevertheless, the application and development of the conventional facilities, typically the foregoing gas detoxicating and de-polluting system 1 as shown in FIG. 1, still have following bottlenecks.

1. In consideration of installation space, the hi-temperature gas detoxicating and de-polluting system 1 can only be built to a limited volume and thus a limited capacity in handling the toxic exhaust gases. In the case that a peak volume of the exhaust gases is met, the liquid-cooling device 12 of the system 1 is usually unaffordable to handle efficiently such a huge amount of gases. As a consequence, the outlet gases of the liquid-cooling device 12 cannot be lowered to a satisfied temperature, and thereby the unexpected higher-temperature outlet gases will tend to damage the filter 14.

2. In the art, the purpose of introducing the toxic exhaust gases into the furnace 10 is to utilize the high temperature interior of the furnace 10 to crack the toxicity of the gases. Definitely, to thoroughly crack the toxic exhaust gases, sufficient reaction time for the gases to stay in the furnace 10 is required. Yet, it is generally seen that a conventional furnace 10 limited in a small installation space is usually hard to completely crack the gases due to insufficient reaction time in the furnace 10.

3. In the conventional liquid-cooling device 12, heat 16 of the hi-temperature exhaust gases (generally heated to 800° C. or higher in the furnace 10) cannot be economically recycled. Therefore, high operational cost of the system 1 would be inevitable. Also, reservation in energy and cooling water would be a serious problem.

4. Further, a great amount of exhaust water 18 generated from operating the liquid-cooling device 12 is also a problem of the conventional system 1.

5. The replacement cost of the filter 14 is high. In addition, for the filter 14 can only function in a lower-temperature environment (compared to the furnace 10), the successful operation of the system 1 does highly depend on the liquid-cooling device 12 which induces the formation and recycle problems of the exhaust heat 16.

Therefore, to provide a better recipe for resolving the aforesaid problems in handling the toxic exhaust gases is definitely welcome to those skilled in the art.

SUMMARY OF THE INVENTION

Accordingly, it is a primary object of the present invention to provide a thermal regenerative granular-moving bed apparatus for a hi-temperature gas de-pollutant/detoxication process, in which hi-temperature granular materials are used to heat and filter the toxic gases, and in which heat of the non-toxic exhaust gases is then recycled in the apparatus to heat up the looping-back granular materials. By providing the apparatus of the present invention, hi-temperature detoxicating upon the toxic gases and recycling of the exhaust heat can be performed in a continuous process in the same apparatus.

In accordance with the present invention, the thermal regenerative granular-moving bed apparatus comprises a plurality of granular materials, a heat-and-clean unit, a heat-recycling unit, and a granular material-cleaning unit.

The granular materials as the major heat-transfer media of the present invention can be far-infrared ceramic granules, conductive silicon granules, or the like porous granules with heat-transfer capability.

The heat-and-clean unit for heating up the incoming toxic gases and simultaneously filtering the gases by the granular materials can include a granular path and a heating device. The granular path flowing the granular materials by gravity can further include at least two consecutive hopper-shaped structures, an upper portion and a lower portion. The granular materials are introduced from the upper portion, flow through the hopper-shaped structures, and leave the heat-and-clean unit from the lower portion. The toxic gases are introduced into the heat-and-clean unit via the perimeter openings between every two consecutive hopper-shaped structures. The heating device is used to heat up the granular materials to a predetermined temperature in order to react with the toxic gases inside the unit.

The heat-recycling unit constructed on top of the upper portion of the heat-and-clean unit is used to provide a piping with a predetermined length for flowing gravitationally the granular materials but for ascending the hi-temperature exhaust gases. The heat-recycling unit can further include an upper end for introducing the granular materials and an exhaust-gas outlet located at the upper end for releasing the exhaust gases.

The granular material-cleaning unit is used to transport the granular materials out of the lower portion of the heat-and-clean unit, then to clean the granular materials off the pollutants generated in the heat-and-clean unit, and further to feed the clean granular materials into the heat-recycling unit from the upper end thereof.

In the present invention, the granular materials are fed into the heat-recycling unit from its upper portion, then flow gravitationally through the heat-recycling unit, enter the heat-and-clean unit via the upper portion thereof, further flow gravitationally through the heat-and-clean unit, leave the heat-and-clean unit via the lower end thereof, and finally are processed by the granular material-cleaning unit so as to be fed back to the heat-recycling unit.

In the present invention, the regions in the heat-recycling unit and the heat-and-clean unit that the granular materials pass by are defined as the granular paths.

In the present invention, the toxic gases are led into the heat-and-clean unit through the intake openings, flow upwards in the granular path at a direction counter to the flow of the granular materials, are heated to crack while passing the pathway in the heat-and-clean unit, and leave the pollutants generated in the cracking to flow downwards with the granular materials. The cracked and so detoxicated gases now in a high-temperature state then ascend along the pathway into the heat-recycling unit, and dissipate the heat to the granular materials flowing counter-directionally. Finally, the detoxicated gases leave the heat-recycling unit via the exhaust-gas outlet at the upper end of the heat-recycling unit. On the other hand, the granular materials heated by the detoxicated gases flow downwards into the heat-and-clean unit for further reacting with the incoming toxic gases.

In the present invention, the pollutants or particles generated during the cracking of the toxic gases are moved with the granular materials and can be separated from the granular materials at the granular material-cleaning unit.

In one embodiment of the present invention, catalyst or other additives can be added into the granular materials for accelerating the detoxicating or say cleaning of the toxic gases. By adding proper additives or catalyst, the detoxicating reaction between the granular materials and the toxic gases may be speeded up, or the reaction temperature of the detoxicating reaction may be substantially lowered.

In one embodiment of the present invention, a plurality of flow-corrective structures can be constructed along the granular path, in the heat-and-clean unit or in the heat-recycling unit, for preventing from formation of stagnant zones in the granular path and also for slowing down the flow rate of the granular materials so as to increase the reaction time of the granular materials and the toxic gases. In the present invention, a typical flow-corrective structure can be a roof shape, a separated inverted-V shape, an upright plate shape, or a pipe shape.

In one embodiment of the present invention, the flow-corrective structure can be located inside the heat-and-clean unit, and the heating device can be constructed at the flow-corrective structure for heating the pass-by granular materials.

In one embodiment of the present invention, the heating device of the heat-and-clean unit can be located at the intake opening between every two consecutive hopper-shaped structures for heating the incoming toxic gases directly.

In one embodiment of the present invention, the heating device of the heat-and-clean unit can be located at the hopper-shaped structure for heating the granular materials thereinside.

In one embodiment of the present invention, the heat-and-clean unit can be enveloped by an inlet chamber, and the heating device can be constructed to the inner wall of the intake chamber for heating the incoming toxic gases thereinside.

In one embodiment of the present invention, the heating device can be constructed along a centerline of the granular path in the heat-and-clean unit.

In one embodiment of the present invention, the granular material-cleaning unit can further include a separator, a polluted granular-material recycle path, and a purified granular-material recycle path. The separator is used to separate the pollutants or particles generated during the hi-temperature detoxicating reaction in the heat-and-clean unit from the granular materials. The polluted granular-material recycle path bridging the lower portion of the heat-and-clean unit and the separator is used to convey the granular materials mixed with the pollutants to the separator. The purified granular-material path bridging the separator and the upper end of the heat-recycling unit is used to transport the purified or clean granular materials back to the heat-recycling unit.

All these objects are achieved by the thermal regenerative granular-moving bed apparatus described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a thermal regenerated granular-moving bed apparatus. In the following description, numerous details are set forth in order to provide a thorough understanding of the present invention. It will be appreciated by those skilled in the art that variations of these specific details are possible while still achieving the results of the present invention. In other instance, well-known components are not described in detail in order not to unnecessarily obscure the present invention.

In the following description, parts of the invention who serve the same purpose but have slight difference in configuration will be identically named and labeled.

Figure 2:
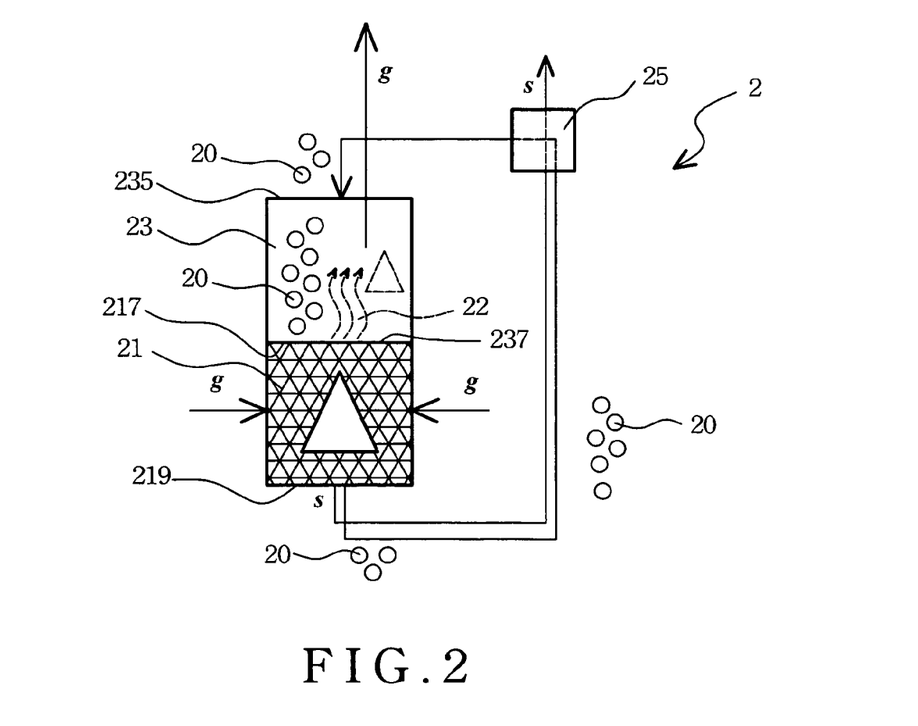
FIG. 2 is a block view of the thermal regenerative granular-moving bed apparatus in accordance with the present invention.
Figure 3:
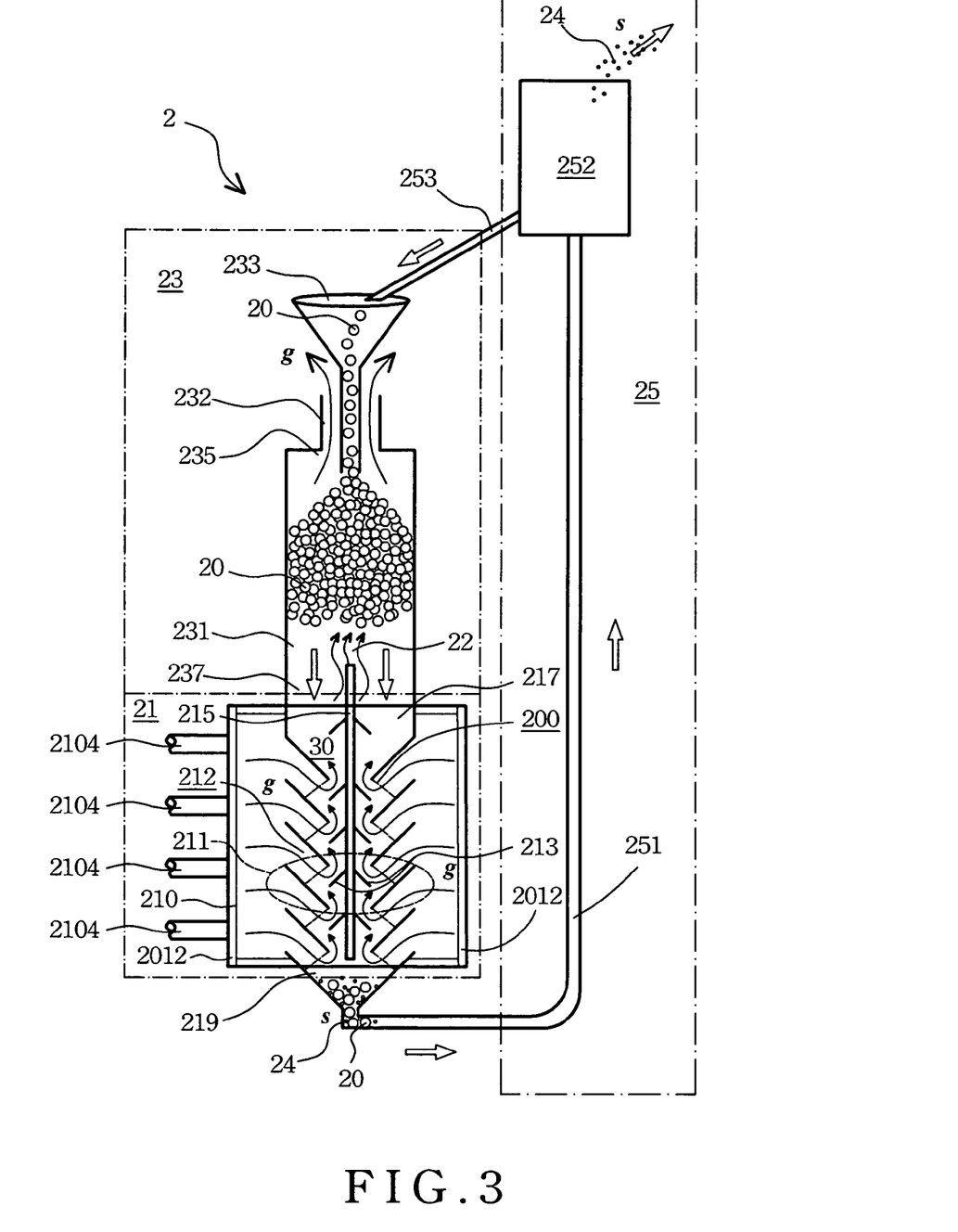
FIG. 3 is a schematic view of a preferred embodiment of the thermal regenerative granular-moving bed apparatus in accordance with the present invention.

Referring now to FIG. 2 and FIG. 3, a preferred embodiment of the thermal regenerative granular-moving bed apparatus in accordance with the present invention is shown in a block view and a schematic view, respectively. The thermal regenerative granular-moving bed apparatus 2 comprises a plurality of granular materials 20, a heat-and-clean unit 21, a heat-recycling unit 23, and a granular material-cleaning unit 25.

Definition: A granular path is a region in the heat-and-clean unit 21 or in the heat-recycling unit 23 where the granular materials 20 pass by.

The granular materials 20 of the present invention having substantial heat-transfer and heat-reservation capacity can be far-infrared ceramic granules, conductive silicon granules, or the like porous granules. In the present invention, the granular materials 20 after heated up to a substantial high temperature (say, above 800° C.) can be applied to crack the surrounding toxic gases, and the pollutants or particles 24 ($SiO_2$) generated during the cracking would be stayed and flow downward with the granular materials 20. That is to say that the granular materials 20 can perform as both a heat provider and a screen for filtering the pollutants 24 off the gases. In the present invention, by controlling the pressure drop inside the heat-and-clean unit 21, a satisfied rate of removing the pollutants 24 from the gases can be achieved. Yet, such a control in the pressure drop is well known to those skilled in the art, and so details thereabout will be omitted herein.

The heat-and-clean unit 21 for heating up the intake toxic gases and filtering the gases off the pollutants 24 (solid reaction products) in the granular path 30 formed by the flowing granular materials 20 can further include the granular path 30 occupying almost the same region indicated by label 21, and a heating device 215.

The granular path 30 flowing the granular materials 30 by gravity can further include at least two consecutive hopper-shaped structures 211 (6 hopper-shaped structures 211 shown in FIG. 3), an upper portion 217 and a lower portion 219 opposing to the upper portion 217. The granular materials 20 are introduced into the granular path 30 at the heat-and-clean unit 21 from the upper portion 217, flow gravitationally through each of the hopper-shaped structures 211, and leave the heat-and-clean unit 21 from the lower portion 219. As shown, the perimeter openings 212 formed between every two consecutive hopper-shaped structures 211 are used to inhale the toxic gases into the heat-and-clean unit 21.

The heating device 215 of the present invention is used to heat up the granular materials 20 inside the heat-and-clean unit 21 to a predetermined high temperature, say over 800° C. The heat energy stored in the granular materials 20 is then used to heat up the toxic gases surrounding each the granular material 20 and thus further to have the toxic gases detoxicated. In the present embodiment, heating device 215 is constructed along a centerline of the granular path 30 mainly in the heat-and-clean unit 21, but partly over the upper portion 217 into the heat-recycling unit 23.

As shown in FIG. 3, the granular materials 20 flow gravitationally, or say downward naturally and continuously, in the granular path 30. Yet, due to the spaced hopper-shaped structures 211, a granular-hill line 200 defining the piling boundary of the granular materials 20 would be formed at each intake opening 212. Actually, the granular-hill line 200 is the very frontier of the granular materials 20 to contact with the toxic gases.

Figure 17:
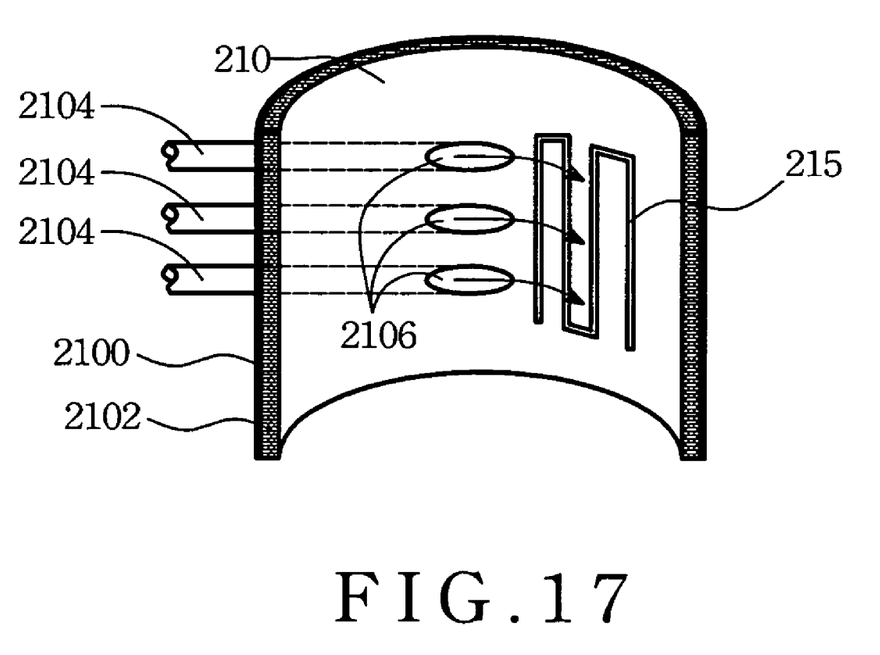
FIG. 17 is a perspective view of a half of the preferred inlet chamber for the heat-and-clean unit of the thermal regenerative granular-moving bed apparatus in accordance with the present invention.

Referring now to FIG. 3 and FIG. 17, the heat-and-clean unit 21 can be further enveloped by an inlet chamber 210, and at least an intake piping 2104 is used to feed the toxic gases into the inlet chamber 210. Preferably, the intake piping 2104 is constructed tangentially to the inner wall 2100 of the inlet chamber 210 so that a vortex flow field can be formed inside the inlet chamber 210 and also the toxic gases inside the inlet chamber 210 can be evenly fed into the heat-and-clean unit 21 through the perimeter intake openings 212. Preferably, the inlet chamber 210 can be constructed with thermal-isolation structures 2102 so as to avoid possible heat dissipation through walls of the inlet chamber 210.

In the present invention, the granular-moving bed structuring adopted to form the heat-and-clean unit 21 is well known to those skilled in the art, for example an ROC (Taiwan) patent "Granular-moving bed apparatus" Pat. No. 545282 and filed on Nov. 19, 2002, and thus details thereabout will be omitted herein.

The heat-recycling unit 23 constructed on top of the upper portion 217 of the heat-and-clean unit 21 is used to provide a piping structure with a predetermined length for flowing gravitationally the granular materials 20 down to the heat-and-clean unit 21, but for ascending the hi-temperature exhaust gases generated from cracking the toxic gases in the heat-and-clean unit 21. It is noted that the flow of the granular materials 20 and the flow of the exhaust gases 22 form counter-flows inside the heat-recycling unit 23. By providing the counter-flows inside the heat-recycling unit 23, the heat carried by the exhaust gases 22 can be used to preheat the granular materials 20 prior to entering the heat-and-clean unit 21. Thereby, a substantial amount of the heat energy provided by the heating device 215 can be recycled to preheat the granular materials 20 inside the heat-recycling unit 23.

In the present invention, a typical heat flow starts at the heating device 215, then goes through the granular materials 20 inside the heat-and-clean unit 21, dissipate to the toxic gases inside the heat-and-clean unit 21, is carried upwards to the heat-recycling unit 23 by the detoxicated exhaust gases, and finally is transferred to the granular materials 20 inside the heat-recycling unit 23 which are on their way downward to the heat-and-clean unit 21.

As shown, the heat-recycling unit 23 can further include an upper end 235 for introducing the granular materials 20, a lower end 237 opposing to the upper and 235 and in communication flowingly with the upper portion 27 of the heat-and-clean unit 21, and an exhaust-gas outlet 232 located at the upper end 237 for releasing the exhaust gases 22.

The granular material-cleaning unit 25 is used to transport the granular materials 20 mixed with the pollutants 24 generated from cracking the toxic gases out of the lower portion 219 of the heat-and-clean unit 21, then to separate or clean the granular materials 20 off the pollutants 24, and further to feed the clean granular materials 20 into the heat-recycling unit 23 from the upper end 235 thereof.

As shown in FIG. 3, the granular material-cleaning unit 25 can further include a separator 252, a polluted granular-material recycle path 251, and a purified granular-material recycle path 253. The separator 252 is used to separate the pollutants 24 or particles generated during the hi-temperature detoxicating reaction in the heat-and-clean unit 21 from the granular materials 20. The polluted granular-material recycle path 251 bridging the lower portion 219 of the heat-and-clean unit 21 and the separator 252 is used to convey the granular materials 20 with the pollutants 24 to the separator 252. The purified granular-material path 253 bridging the separator 252 and the upper end 235 of the heat-recycling unit 23 is used to transport or feed the purified or clean granular materials 20 back to the heat-recycling unit 23. As shown, a hopper-shaped granular-material inlet 233 is constructed at the upper end 235 of the heat-recycling unit 23 for receiving the clean granular materials 20 from the purified granular-material recycle path 253.

In the present invention, the flow of the granular materials 20 starts at the top end 235 of the heat-recycling unit 23, goes downward through the heat-recycling unit 23 where the granular materials 20 are pre-heated by the hi-temperature exhaust gases 22, then enters the heat-and-clean unit 21 from the upper portion 217 thereof in which the temperature of granular material 20 can be further assured to the predetermined temperature by the heating device 215 and in which the granular materials react with the toxic gases, then leaves the heat-and-clean unit 21 from the lower portion 219, and finally goes back to the heat-recycling unit 23 via the granular material-cleaning unit 25.

In the present invention, the flow of the gases starts as the toxic gases introduced to the heat-and-clean unit 21 from the intake openings 212, goes upward as a counter flow to the flow of the granular materials 20 in the granular path 30 in which the toxic gases are hi-temperature cracked and thus detoxicated by the granular materials 20 and in which the pollutants 24 are generated during the cracking, leaves the pollutants to flow with the granular materials 20 as nontoxic or detoxicated hi-temperature exhaust gases 22, ascends to the heat-recycling unit 23 to further heat-exchange with the granular materials 20 thereinside, and is released as lower-temperature gases from the exhaust-gas outlet 232 at the upper end 235 of the heat-recycling unit 23.

In the present invention, the pollutants or particles 24 generated during the cracking of the toxic gases inside the heat-and-clean unit 21 are held by and thereafter moved with the granular materials 20, and, in a later step, can be separated from the granular materials 20 at the granular material-cleaning unit 25.

In the heat-recycling unit 23 of the present invention, the hi-temperature detoxicated exhaust gases 22 rising from the heat-and-clean unit 21 can heat-exchange with (or say pre-heat) the granular materials 20 fallen down from the granular-material inlet 233 at the upper end 235 of the heat-recycling unit 23. Upon such an arrangement, the exhaust heat after cracking the toxic gases can be efficiently utilized to preheat the granular materials 20 and thus the operational cost in energy can be substantially reduced.

In the present invention, catalyst or other additives can be added or adhered to the granular materials 20 for accelerating the detoxicating reaction between the granular materials 20 and the toxic gases, or for reducing the throttle reaction temperature.

As shown in FIG. 3, a plurality of flow-corrective structures 213 can be constructed along the granular path 30 in the heat-and-clean unit 21 for preventing from possible formation of stagnant zones in the granular path 30 and also for slowing down the flow rate of the granular materials 20 so as to increase the contact time between the granular materials 20 and the toxic gases. Similarly, in other embodiment of the present invention (not shown in the figures), the low-corrective structures 213 can also be constructed in the granular path 30 of the heat-recycling unit 23.

Figure 4:
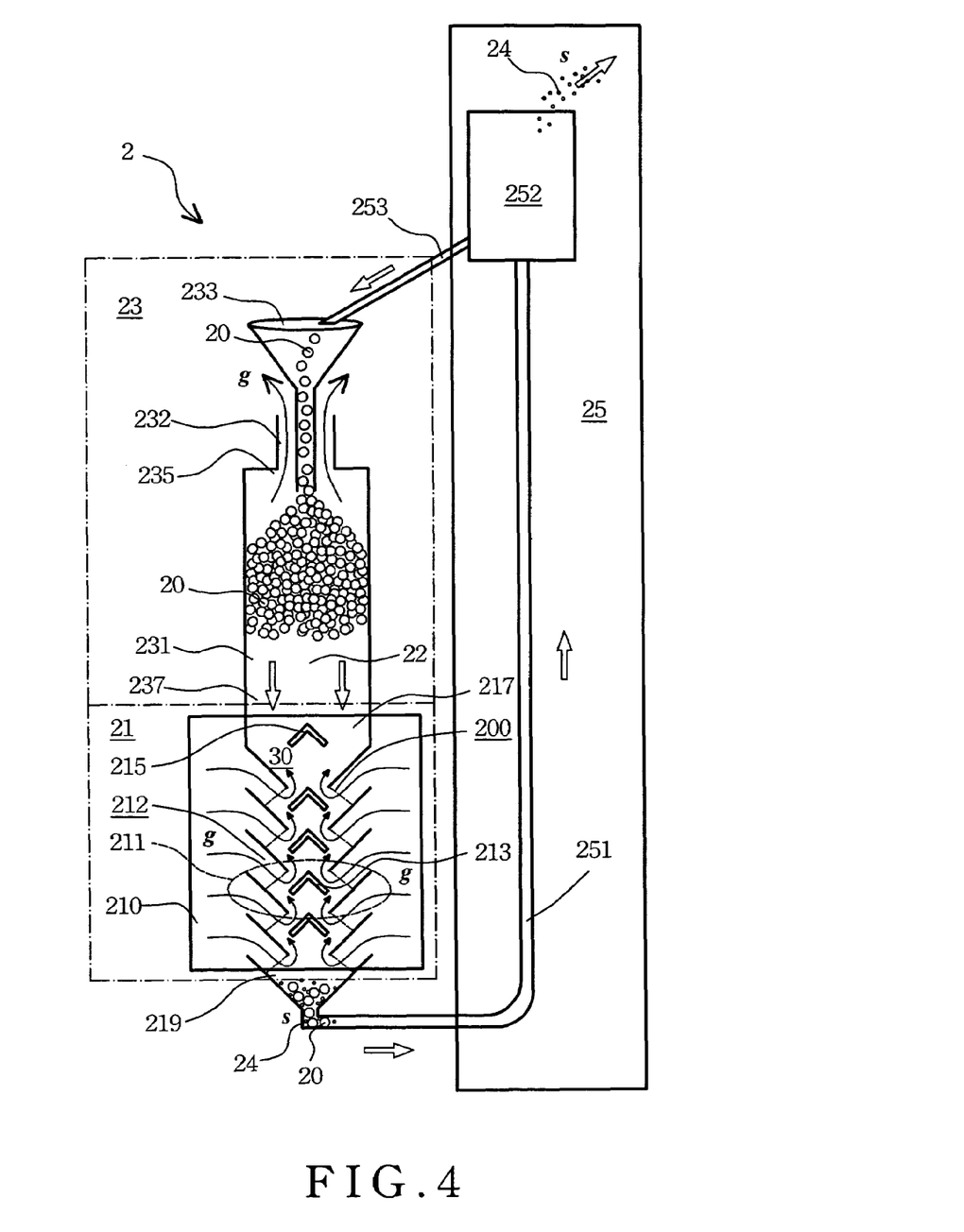
FIG. 4 is a schematic view of another embodiment of the thermal regenerative granular-moving bed apparatus in accordance with the present invention.

Referring now to FIG. 4, another embodiment of the regenerative granular-moving bed apparatus in accordance with the present invention is shown schematically. Compared to the previous embodiment shown in FIG. 3, this embodiment 2 has its heating device 215 constructed at the flow-corrective structures 213 of the heat-and-clean unit 21 for heating the granular materials 20 flowing around the flow-corrective structures 213.

Figure 5:
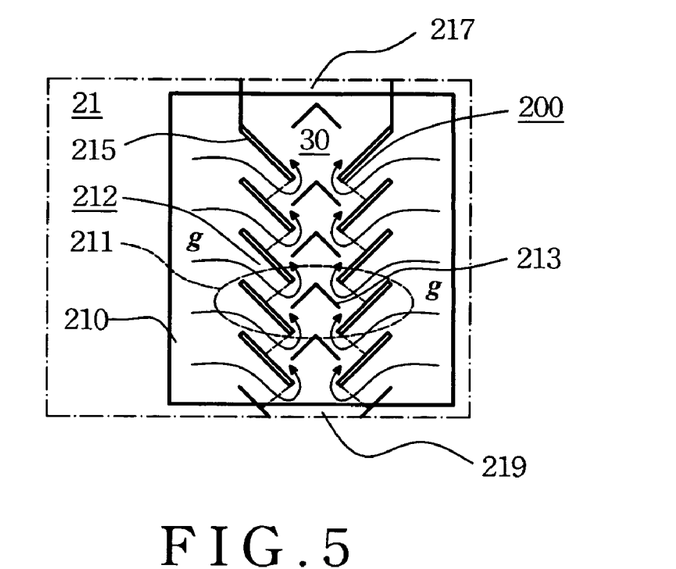
FIG. 5 is a schematic view of an embodiment of the heat-and-clean unit of the thermal regenerative granular-moving bed apparatus in accordance with the present invention.

Referring now to FIG. 5, an embodiment of the heat-and-clean unit 21 of the regenerative granular-moving bed apparatus in accordance with the present invention is shown schematically. Compared to the previous embodiment shown in FIG. 3, this embodiment 2 has its heating device 215 constructed at the hopper-shaped structures 211 of the heat-and-clean unit 21 for heating the granular materials 20 flowing inside the hopper-shaped structures 211.

Figure 6:
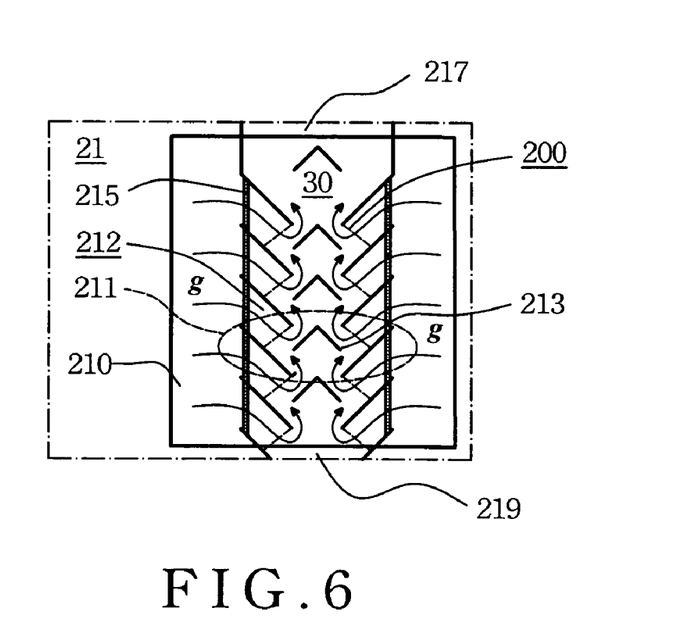
FIG. 6 is a schematic view of another embodiment of the heat-and-clean unit of the thermal regenerative granular-moving bed apparatus in accordance with the present invention.

Referring now to FIG. 6, another embodiment of the heat-and-clean unit 21 of the regenerative granular-moving bed apparatus in accordance with the present invention is shown schematically. Compared to the previous embodiment shown in FIG. 3, this embodiment 2 has its heating device 215 constructed at the intake openings 212 between every two consecutive hopper-shaped structures 211 for heating the incoming toxic gases directly. The heated toxic gases are then sent to the granular path 30 and confront with the granular materials 20 flowing thereinside to finish the cracking and pollutant-filtering reaction as described above.

Figure 7:
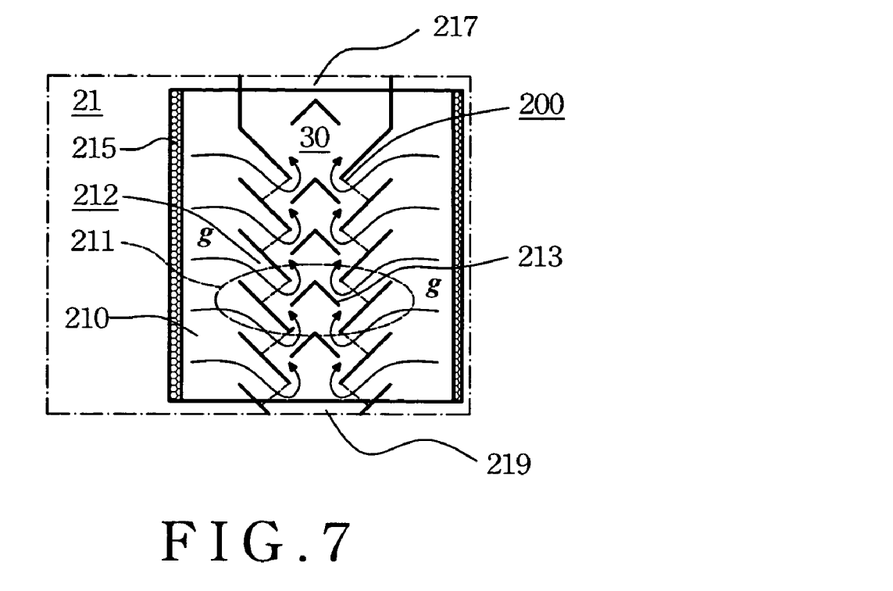
FIG. 7 is a schematic view of a further embodiment of the heat-and-clean unit of the thermal regenerative granular-moving bed apparatus in accordance with the present invention.

Referring now to FIG. 7, a further embodiment of the heat-and-clean unit 21 of the regenerative granular-moving bed apparatus in accordance with the present invention is shown schematically. Compared to the previous embodiment shown in FIG. 3, this embodiment 2 has its heating device 215 constructed at the inner wall of the inlet chamber 210 for preheating the toxic gases thereinside.

Referring now to FIG. 17, a perspective view of a half of the preferred inlet chamber 210 for the heat-and-clean unit 21 of the thermal regenerative granular-moving bed apparatus in accordance with the present invention is shown. The inlet chamber 210 for enveloping the heat-and-clean unit 21, particularly the intake openings 212, can have the inner wall 2100 decorated or lined with the thermal-isolation structures 2102. The intake piping 2104 (three separate pipes shown in the figure) is preferably arranged tangentially to the inner wall 2100 of the inlet chamber 210 so that the toxic gases after leaving the intake holes 2106 of the intake piping 2104 can enter the inlet chamber 210 at a tangential direction. Also shown in FIG. 17, the heating device 215 can be constructed to the inner wall 2100 (or say chamber wall) of the inlet chamber 210 for preheating the toxic gases inhaled through the intake piping 2104.

Figure 8:
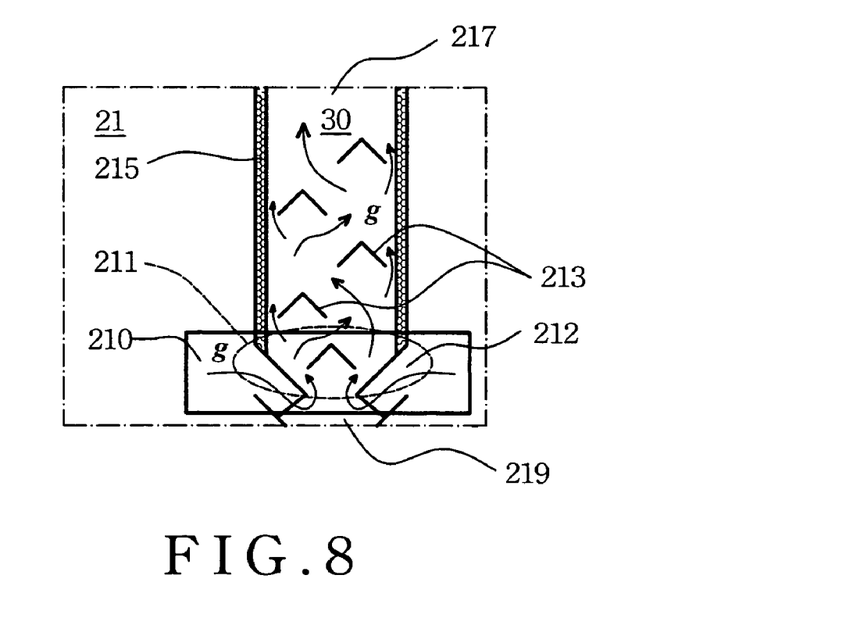
FIG. 8 is a schematic view of one more embodiment of the heat-and-clean unit of the thermal regenerative granular-moving bed apparatus in accordance with the present invention.

Referring now to FIG. 8, one more embodiment of the heat-and-clean unit 21 of the regenerative granular-moving bed apparatus in accordance with the present invention is shown schematically. In this embodiment, the heat-and-clean unit 21 has its upper portion 217 shaped as a pipe structure with interior flow-corrective structures 213 which are offset-arranged in the granular path 30. The heating device 215 is located at the upper portion 217 for heating the granular materials 20 flowing through the pipe-shaped upper portion 217.

In the aforesaid descriptions of the present invention, particularly from FIG. 3 to FIG. 8, the heating device 215 is constructed only at a specific location. Yet, the apparatus of the present invention can also have a combination of the heating devices 215 constructed at various locations indicated by FIG. 3 through FIG. 8. For example, the regenerative granular-moving bed apparatus in accordance with the present invention can have a first heating device of FIG. 3 and a second heating device of FIG. 6.

Figure 9:
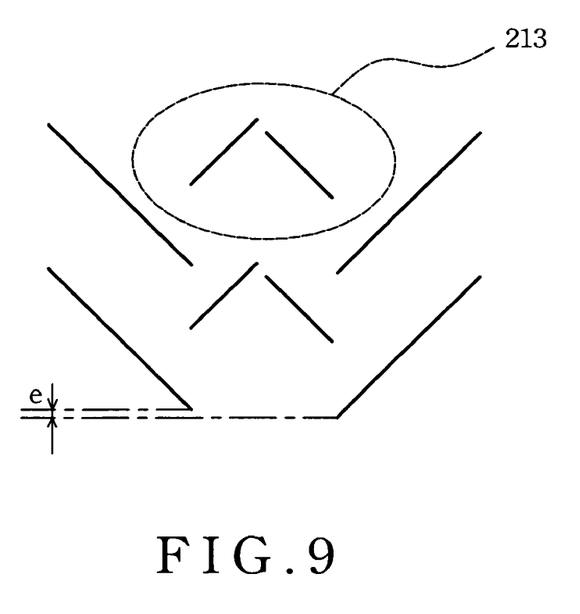
FIG. 9 is a schematic cross-sectional view of an embodiment of two consecutive hopper-shaped structures of the heat-and-clean unit of the thermal regenerative granular-moving bed apparatus in accordance with the present invention.
Figure 10:
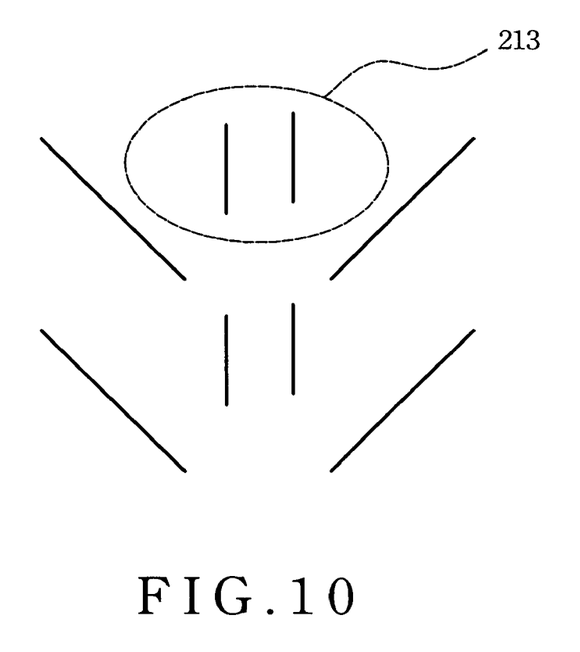
FIG. 10 is a schematic cross-sectional view of another embodiment of two consecutive hopper-shaped structures of the heat-and-clean unit of the thermal regenerative granular-moving bed apparatus in accordance with the present invention.
Figure 11:
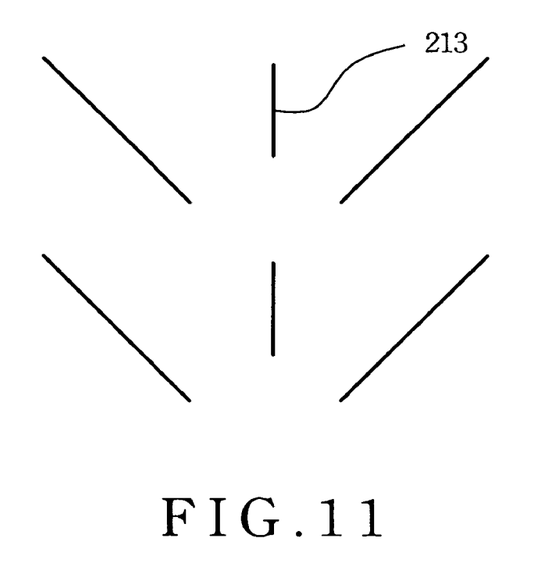
FIG. 11 is a schematic cross-sectional view of a further embodiment of two consecutive hopper-shaped structures of the heat-and-clean unit of the thermal regenerative granular-moving bed apparatus in accordance with the present invention.
Figure 12:
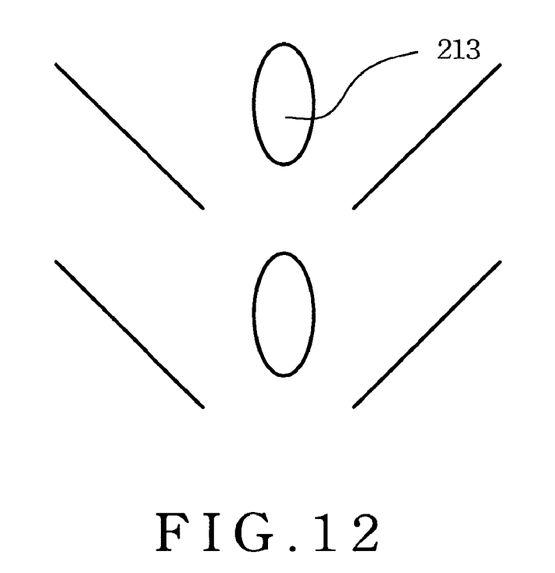
FIG. 12 is a schematic cross-sectional view of one more embodiment of two consecutive hopper-shaped structures of the heat-and-clean unit of the thermal regenerative granular-moving bed apparatus in accordance with the present invention.
Figure 13:
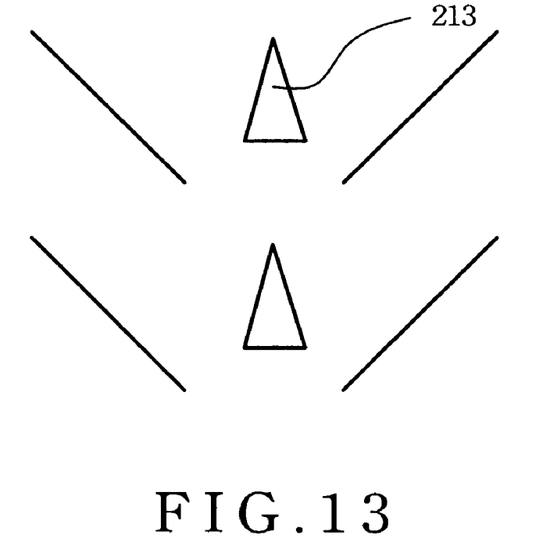
FIG. 13 is a schematic cross-sectional view of further one more embodiment of two consecutive hopper-shaped structures of the heat-and-clean unit of the thermal regenerative granular-moving bed apparatus in accordance with the present invention.
Figure 14:
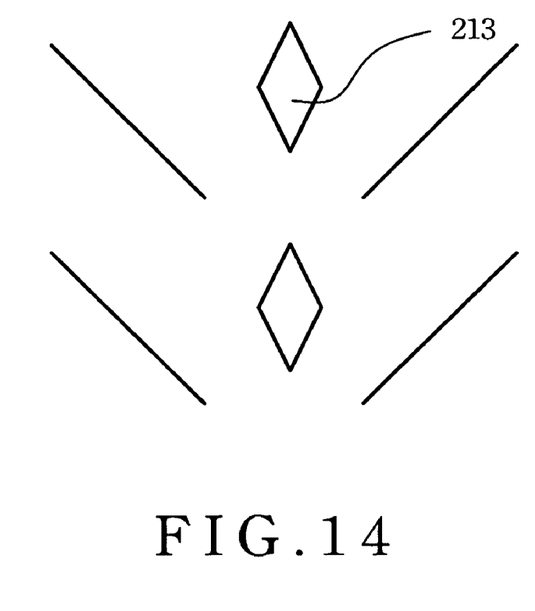
FIG. 14 is a schematic cross-sectional view of another further one more embodiment of two consecutive hopper-shaped structures of the heat-and-clean unit of the thermal regenerative granular-moving bed apparatus in accordance with the present invention.

In the present invention, the flow-corrective structures 213 can be various shaped. The flow-corrective structure 213 can be formed as a roof shape of FIG. 3, a separated inverted-V shape of FIG. 9 (also note that the two lateral sides of the hopper-shaped structure 211 are offset by a height e), a shape having two parallel upright plates of FIG. 10, an upright plate shape of FIG. 11, or various pipe shapes of FIG. 12 to FIG. 14 (an elliptical shape, a triangle shape, and a diamond shape, respectively).

Figure 15:
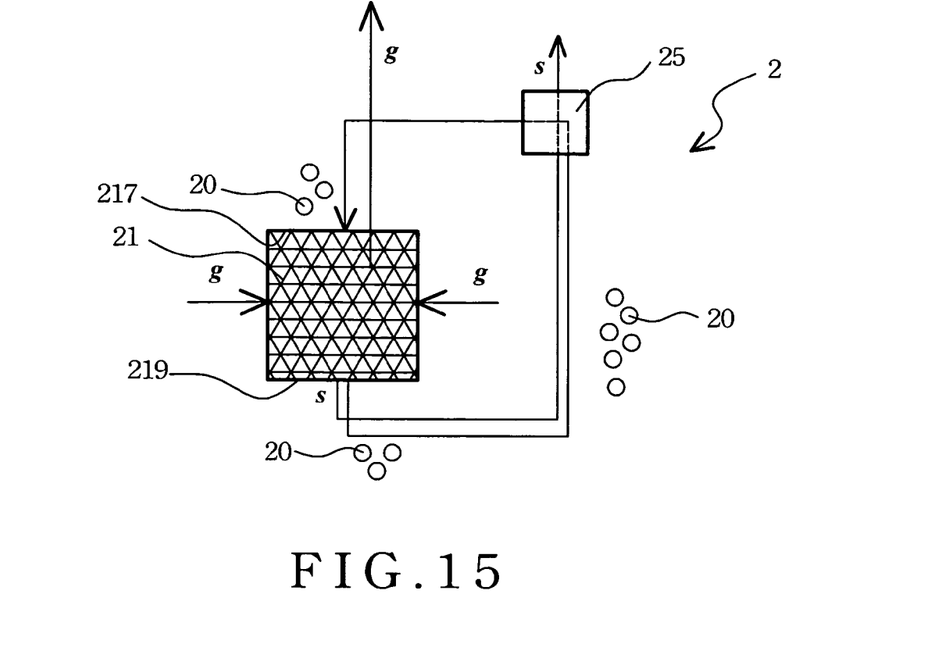
FIG. 15 shows, in a block view, another aspect of the thermal regenerative granular-moving bed apparatus in accordance with the present invention.

Referring now to FIG. 15, another aspect of the thermal regenerative granular-moving bed apparatus in accordance with the present invention is schematically block shown. Compared to the apparatus of FIG. 2, this aspect of the apparatus removes the whole section of the heat-recycling unit 23 and have the clean or purified granular materials 20 fed directly into the upper portion 217 of the heat-and-clean unit 21. Also, the detoxicated exhaust gases are released from the upper portion 217.

As shown in FIG. 15, the heat-and-clean unit 21 does not have any heating device (note that the triangle symbol in FIG. 2 is not shown here). Therefore, if the gases to be processed need to be heated up to a predetermined temperature, they shall be preheated to the predetermined temperature prior to entering the heat-and-clean unit 21. For various techniques in heating the gases can be applied and well-known to those skilled in the art, details thereabout will be omitted herein.

Figure 16:
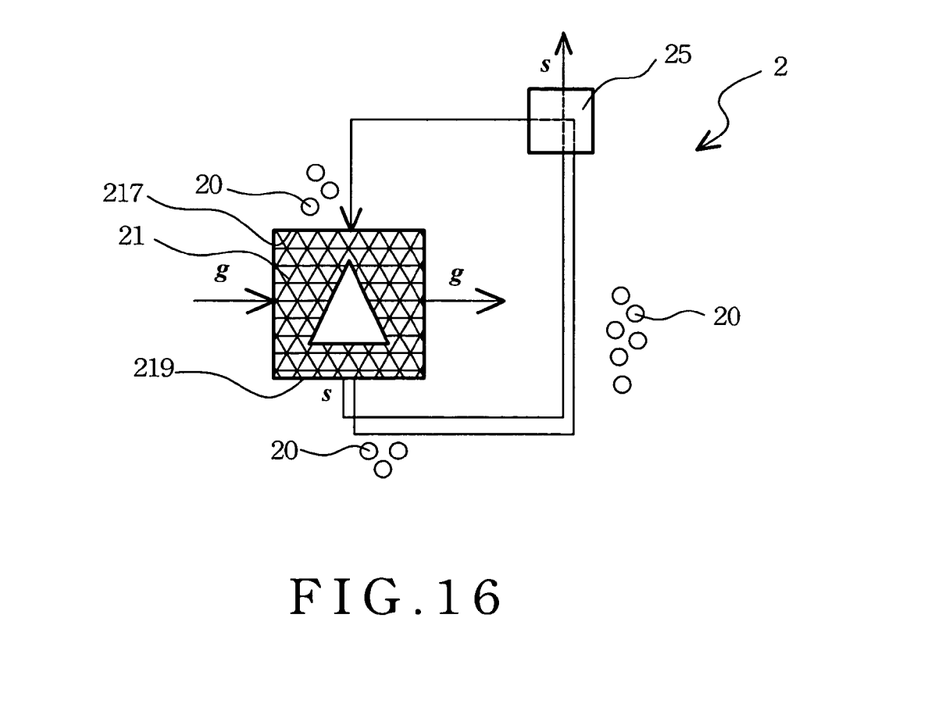
FIG. 16 shows, in a block view, a further aspect of the thermal regenerative granular-moving bed apparatus in accordance with the present invention.

Referring now to FIG. 16, a further aspect of the thermal regenerative granular-moving bed apparatus in accordance with the present invention is schematically block shown. Compared to the apparatus of FIG. 15, this aspect of the apparatus adopts a heat-and-clean unit 21 who allow the toxic gases to enter from one side of the perimeter openings between every two consecutive hopper-shaped structures (left in the figure), and the detoxicated gases to leave from the opposing side thereof (right in the figure). Obviously, such an arrangement of the gases flow is the major difference to the previous designs as described above. Also, this aspect of the apparatus includes the heating device symbolized by the triangle centering the heat-and-clean unit 21. The location of the heating device can be any one mentioned above in the foregoing embodiments of the present invention.

In the present invention, the thermal regenerative granular-moving bed apparatus can be used to crack and filter the toxic and, definitely, nontoxic gases.

By providing the thermal regenerative granular-moving bed apparatus in accordance with the present invention, various purposes in heating, cracking, filtering and so on can be achieved in a single apparatus such that the cost for processing the toxic or nontoxic gases can be substantially reduced and the hi-temperature breakdown of the filter in the convention design can be avoided.

In the present invention, the thermal regenerative granular-moving bed apparatus can be built in a limited space but can provide a broader contact area (thank to the granular materials) to crack and filter the gases. Thus, the detoxication upon the toxic gases by applying the present invention can be assured.

In the present invention, the arrangement of utilizing the hi-temperature nontoxic exhaust gases to preheat the purified granular materials inside the heat-recycling unit can be great helpful in energy reservation as well as in preventing the hi-temperature exhaust gases from damaging the environment.

In the present invention, in the case that the incoming toxic or nontoxic gases are already hi-temperature ones, the heating device of the apparatus can be treated as an auxiliary heating facility. Similarly, in the case that the granular materials fed into the apparatus are already hi-temperature ones, the heating device can also be seen as an auxiliary heating facility.

In the present invention, in the case that the heating device is an auxiliary heating facility or an optional device, the regenerative granular-moving bed apparatus described above can be simply treated as an air-filtering apparatus.

In previous descriptions of the present invention, though recyclable granular materials are used, yet non-recyclable granular materials can still be applied. In the case that the non-recyclable granular materials are applied, functions of the granular material-cleaning unit described above are limited to feed the clean granular materials into the heat-recycling unit or the heat-and-clean unit (in FIG. 15 and FIG. 16), and to convey the granular materials mixed with pollutants out of the heat-and-clean unit. No separator is needed in such an application.

While the present invention has been particularly shown and described with reference to a preferred embodiment, it will be understood by those skilled in the art that various changes in form and detail may be without departing from the spirit and scope of the present invention.

We claim:

1. A thermal regenerative granular-moving bed apparatus, comprising:
    a plurality of granular materials;
    a heat-and-clean unit for heating up incoming gases and simultaneously filtering the gases by the granular materials, further including at least two consecutive hopper-shaped structures, an upper portion and a lower portion opposing to the upper portion; the granular materials flowing through the heat-and-clean unit gravitationally by entering the heat-and-clean unit from the upper portion, flowing through each of the hopper-shaped structures, and leaving the heat-and-clean unit from the lower portion; the gases being introduced into the heat-andclean unit from one side of perimeter openings between every two consecutive hopper-shaped structures, and leaving the heat-and-clean unit from the upper portion;

a heating device, constructed at a predetermined location inside the heat-and-clean unit for heating the granular materials to a predetermined temperature; and a granular material-cleaning unit, constructed on top of the upper portion for providing the granular materials to the heat-and-clean unit;

in which a granular path is defined as a region inside the heat-and-clean unit where the granular materials pass by.

2. The thermal regenerative granular-moving bed apparatus according to claim 1, further including a heat-recycling unit constructed between said granular material-cleaning unit and said upper portion for providing a piping with a predetermined length to flow gravitationally said granular materials there inside to said heat-and-clean unit, the heat-recycling unit further including an upper end for introducing said granular materials.

3. The thermal regenerative granular-moving bed apparatus according to claim 1, wherein said granular materials are provided with catalyst added.

4. The thermal regenerative granular-moving bed apparatus according to claim 1, further including a plurality of flow-corrective structures along said granular path.

5. The thermal regenerative granular-moving bed apparatus according to claim 4, wherein said heating device is constructed at said flow-corrective structures.

6. The thermal regenerative granular-moving bed apparatus according to claim 4, wherein said flow-corrective structure has a roof-shaped cross section.

7. The thermal regenerative granular-moving bed apparatus according to claim 4, wherein said flow-corrective structure has a cross section of a separated inverted-V shape.

8. The thermal regenerative granular-moving bed apparatus according to claim 4, wherein said flow-corrective structure includes an upright plate.

9. The thermal regenerative granular-moving bed apparatus according to claim 4, wherein said flow-corrective structure has a pipe-shaped cross section.

10. The thermal regenerative granular-moving bed apparatus according to claim 1, wherein said heating device is constructed along a center line of said granular path.

11. The thermal regenerative granular-moving bed apparatus according to claim 1, wherein said heating device is constructed at said hopper-shaped structures.

12. The thermal regenerative granular-moving bed apparatus according to claim 1, wherein said heating device is constructed at said perimeter openings that introduce said gases into said heat-and-clean unit.

13. The thermal regenerative granular-moving bed apparatus according to claim 1, wherein said heat-and-clean unit is enveloped by an inlet chamber, the inlet chamber further including at least an intake piping for introducing said gases into the inlet chamber.

14. The thermal regenerative granular-moving bed apparatus according to claim 13, wherein said heating device is constructed to an inner wall of said inlet chamber.

15. The thermal regenerative granular-moving bed apparatus according to claim 13, wherein said inner wall includes thermal-isolation structures and said gases enter said inlet chamber at a tangential direction with respect to said inner wall.

16. The thermal regenerative granular-moving bed apparatus according to claim 1, wherein said granular material-cleaning unit further includes:

a separator for separating pollutants generated during a reaction in said heat-and-clean unit off said granular materials;

a polluted granular-material recycle path, bridging said lower portion and the separator for conveying said granular materials mixed with said pollutants to the separator; and a purified granular-material recycle path, bridging the separator and said upper portion for transporting said granular materials back to said heat-and-clean unit.

* * * * *